United States Patent Office 2,854,087
Patented Sept. 30, 1958

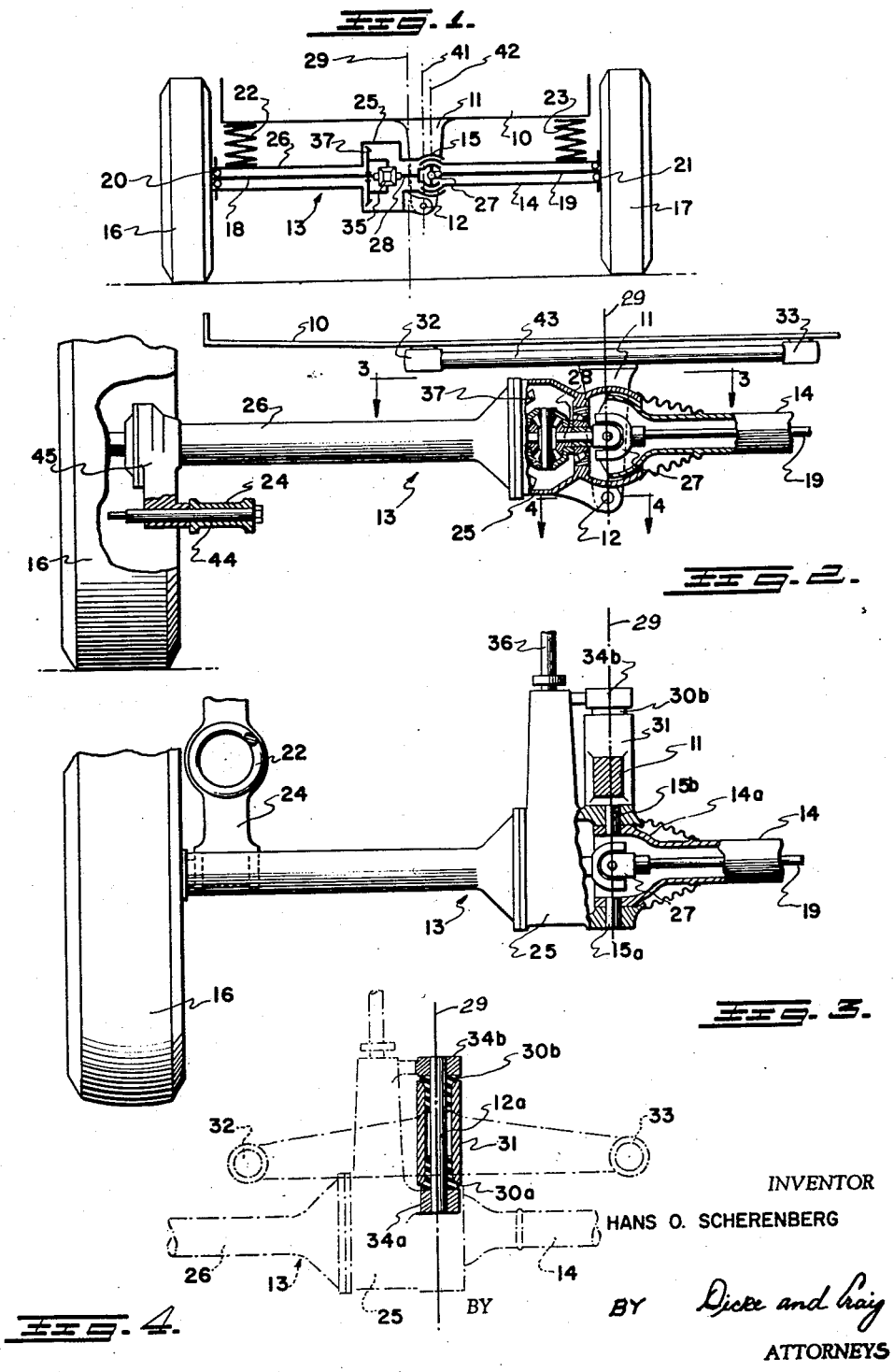

2,854,087

AXLE SUSPENSION WITH SWINGING HALF AXLES

Hans O. Scherenberg, Stuttgart-Heumanden, Germany, assignor to Daimler-Benz Aktiengesellschaft, Stuttgart-Unterturkheim, Germany Application March 8, 1955, Serial No. 492,875

Claims priority, application Germany March 10, 1954

7 Claims. (Cl. 180—73)

The present invention relates to axle suspension with swinging half axles, and more particularly to axle suspensions with swinging half axles which also include the drive mechanism for the wheels. It has already been proposed for such axle suspensions to connect the two half axles with the frame or body of the vehicle by means of a common joint member located below the wheel centers or wheel drive shafts. In that case, the connecting joint, which connects the two drive shafts for the wheels, is located approximately vertically above the common joint member for the half axles. Such arrangements have, among others, the advantages that as a result of the relatively low position of the common joint member for the half axles and of the large swinging radii, a very good roadability is achieved, and that in spite of it only a single one of the relatively expensive Cardan joints is necessary. However, such an arrangement makes it necessary that an adjustability in the longitudinal or axial direction be provided within the wheel drive shafts, for example, in the form of splined connections which permit relative movements in the axial direction but prevent relative rotational movements of the splined parts, as the center point of the joint connecting the drive shafts does not coincide with the pivot axis of the swinging joint member connecting the swinging half axles with each other, whereby during swinging movements of the half axles the lack of coincidence of the pivot axes of the swinging half axles and of the drive shafts must be compensated for by permitting one or the other, usually the drive shafts, to vary the overall length thereof.

Accordingly, it is an object of the present invention to provide an improvement in such axle suspensions which consists essentially in that one of the two half axles is connected with the frame or vehicle body by means of a joint located below the wheel center or wheel drive shafts, whereas the other half axle is connected with the first half axle by a joint, the pivoting axis of which passes through the center point of the connecting joint between the right and left wheel drive shafts. It is particularly appropriate if the swinging half axle, preferably the left axle, which includes the axle drive mechanism, especially a differential, is pivotally connected directly to the frame or vehicle body to enable pivotal movement of the swinging half axle about a pivot axis extending in a direction substantially parallel to the longitudinal center plane of the vehicle.

It is a further object of the present invention to provide a suspension for swinging half axles which combines good roadability with a relatively simple construction.

It is another object of the present invention to provide a suspension for swinging half axles in which axial forces may be transmitted from one wheel to the other thereby decreasing the danger of oversteering.

It is a further object of the present invention to provide a suspension for swinging half axles in which the half axles or at least one half axle is connected with the frame or body of the vehicle at a point lying below the center of the wheels or below the drive shafts for the wheels and which obviates the necessity for compensation due to the different centers of rotation of the swinging half axles and the drive shafts for the wheels.

It is still a further object of the present invention to provide a suspension for swinging half axles in which the drive shafts for the wheels which may be arranged, for example, within the swinging half axles, may be made interchangeably alike.

The arrangement according to this invention has the advantage that the good driving characteristics obtainable with the prior art suspensions, for example, a decrease in the tendency for oversteering as a result of the low pivot point of the axle, which is connected directly with the frame or vehicle body, and of the long swinging radii, may be achieved without requiring an adjustability within the wheel drive shafts in the longitudinal or axial directions thereof to permit increase or decrease in the overall length thereof.

Furthermore, lateral forces may be transmitted directly from one wheel over both half axles to the other wheel which is especially important while traversing curves by reason of the centrifugal forces which occur between the wheel and the road, when the limit for the lateral forces is reached at one wheel by the particular loading thereof and this wheel would actually slip if a part of the lateral forces were not transmitted or taken over by the other wheel.

Furthermore, according to the present invention, it is proposed that the axle drive mechanism and the connecting joint between the two wheel drive shafts be arranged at such a distance from the vertical longitudinal center plane of the vehicle on each side thereof that the wheel drive shaft between one wheel and the connecting joint, on the one hand, and the wheel drive shaft between the other wheel and the axle drive mechanism, on the other, are of equal length. The manufacture and bearing supports of the wheel drive shafts are very much facilitated when the right and left shaft are of the same length so as to be also completely interchangeable with each other.

Furthermore, the axle drive housing in such a construction may be positioned thereby more closely toward the vertical central longitudinal plane of the vehicle, whereby the Cardan shaft may be arranged with a less incline so that the Cardan tunnel necessary in passenger vehicles need not be made as wide or located as much to one side.

Further objects, features and advantages of the present invention will become more obvious from the following description, when taken in connection with the accompanying drawing which shows, for purposes of illustration only, several preferred embodiments in accordance with the present invention, and wherein:

Figure 1 is a schematic rear end view of an axle suspension in accordance with the present invention.

Figure 2 is a rear view, partially in cross section, of a different embodiment in accordance with the present invention.

Figure 3 is a top view partially in section along line III—III of Figure 2, and

Figure 4 is a top view partially in section along line IV—IV of Figure 2.

Referring now to the drawing wherein like reference numerals designate like parts throughout the various views, and more particularly to Figure 1, reference numeral 13 designates the left swinging half axle. The vehicle body or frame 10 is provided with a downwardly extending support member 11 for supporting the left swinging half axle by means of the pivotal joint 12.

The right swinging half axle in turn is pivotally connected with the left swinging half axle 13 by means of a joint 15 which may consist of two appropriately shaped parts complementary with respect to each other so as to permit the desired relative movement with respect to each other.

The wheels 16 and 17 are supported by the swinging half axles 13 and 14 and are driven by the drive shafts 18 and 19 which extend within the tube-shaped swinging half axles 13 and 14. The drive shafts 18 and 19 are supported in the half axles 13 and 14 in any conventional manner, as, for example, by ball bearings 20 and 21.

The driven wheels illustrated herein, may be the rear wheels if the vehicle is driven at the rear wheels. However, it is understood that the present invention is not restricted thereto but is applicable to any driven wheels.

Appropriate springs, such as helical or coil springs 22 and 23 serve for springily supporting the swinging half axles 13 and 14 against the frame or vehicle body 10, whereby the springs 22 and 23 may abut with the lower ends thereof against thrust guides 24 to be more fully described in connection with Figures 2 and 3, and with the upper ends thereof against the vehicle body or frame 10.

The left swinging half axle 13 includes the axle drive housing 25, which encloses the axle drive means 35, 37 such as a differential, and the tubular housing 26 which encloses the wheel drive shaft 18.

The left drive shaft 18 is connected with the right drive shaft 19 by means of a universal joint 27 including parts of the axle drive means, for example, of the cross-type universal joint, the center point of which coincides with the axis of rotation of the joint 15 interconnecting the left swinging half axle 13 with the right swinging half axle 14.

It is not necessary that the joint 12 connecting the left half axle 13 to support member 11 and the joint 15 interconnecting the left half axle to the right half axle be arranged on a vertical projection one above the other in a cross plane of the vehicle. Furthermore, it is also unnecessary that the vertical central longitudinal plane 29 of the vehicle passes through one of the aforementioned joints. This is clearly indicated in Figure 1 in which the vertical longitudinal plane 41 passing through the center of the joint 12 and the vertical longitudinal plane 42 passing through the center point of the joint 15 and of the joint 27 do not coincide with each other and do not coincide with the vertical central longitudinal plane 29 of the vehicle.

It should be noted that in Figure 1 the locations of the differential 35 and of the joints 15 and 27 are so chosen with respect to the central longitudinal plane 29 that the drive shafts 18 and 19 are of the same length, and are, therefore, interchangeably alike.

In the embodiment according to Figures 2 and 4, the joint 12 and the joint 15 and therewith also the joint 27 all lie in the longitudinal central plane 29 of the vehicle.

The joint 12 is formed by a pivot pin 12a (Figure 4) which is supported or journalled in a sleeve-like portion 31 of the support member 11 by means of, for example, rubber bushings 30a and 30b. The support member 11 is connected to the frame or vehicle body 10 at two laterally spaced points 32 and 33 by the intermediary of rubber buffers or bushings (not shown in the drawing), of any conventional construction on both sides of the central longitudinal plane of the vehicle, a cross member 43 serving as connection between the support member 11 and the points 32 and 33.

The left swinging half axle 13 which includes the axle drive housing 25 is provided with lugs 34a and 34b extending downwardly to the right which are spaced from each other a distance so as to surround the sleeve portion 31 on both sides thereof. The pivot pin 12a extends into the openings provided in the eyelets 34a and 34b.

The joint 15 which connects the left swinging half axle 13 with the right swinging half axle 14 is formed by pins 15a and 15b which extend through appropriate openings in both the axle housing 25 and the enlarged portion 14a of the right swinging half axle 14.

The center point of the cross-type universal joint 27 which is accommodated in the enlarged portion 14a coincides with the pivot axes of pins 15a and 15b.

The shafts 18 and 19 are driven by the driving engine (not shown) of the vehicle, for example, through a change-speed transmission (not shown) a Cardan shaft 36 which is in driving connection with the arcuate gear 37 connected with the differential 35.

The thrust guides 24 supporting the lower ends of the springs 22 and 23 (not shown in Figures 2 to 4) are pivotally supported on pins 44 extending inwardly toward the center of the vehicle from dependent projections 45 secured to respective half axles 13 and 14.

The term "superstructure" is used hereinafter in the claims to designate the portion 10 of the vehicle, such as frame, auxiliary frame, chassis, self-supporting vehicle body, etc., to which the support member 11 is secured.

While I have shown only two preferred embodiments according to my invention, it is understood that the same is susceptible of many changes and modifications within the scope of a person skilled in the art, and I, therefore, do not intend to limit myself thereto except as defined by the appended claims.

I claim:

1. A wheel suspension for swinging half axles supporting the wheels of a vehicle with a superstructure comprising means for pivotally supporting only one of said half axles at said superstructure below the centers of the wheels to enable pivotal movement of said one half axle about a pivot axis extending in a direction non-parallel to said half axle, axle drive means, two wheel drive shafts driven by said axle drive means, first joint means including a part of said axle drive means for pivotally connecting said two shafts with each other, and second joint means coaxial with said first mentioned joint means arranged at a height at least essentially equal to the level of the center of said wheels for pivotally connecting said two swinging half axles with each other and to enable pivotal movement of said other half axle about a pivot point located substantially at the level of said height, the other one of said half axles being of constant length and the pivotal movement thereof being determined by said coaxial joint means only.

2. The combination according to claim 1, wherein said drive means includes differential gear means.

3. A wheel suspension for swinging half axles supporting the wheels of a vehicle with a superstructure comprising means for elastically and pivotally supporting only one of said half axles directly at said superstructure below the centers of the wheels to enable pivotal movement of said one half axle about a pivot axis extending in a direction non-parallel to said half axle, axle drive means, two wheel drive shafts driven by said axle drive means and driving said wheels, the left swinging half axle enclosing said axle drive means, first joint means including a part of said axle drive means for pivotally connecting said two shafts with each other, and second joint means coaxial with said first-mentioned joint means arranged at a height at least essentially equal to the level of the center of said wheels for pivotally connecting said two swinging half axles with each other and to enable pivotal movement of said other half axle about a pivot point located substantially at the level of said height, the other one of said half axles being of constant length and the pivotal movement thereof being determined by said coaxial joint means only.

4. A wheel suspension for swinging half axles supporting the wheels of a vehicle with a superstructure comprising means for pivotally supporting only one of said half axles at said superstructure below the centers of the wheels to enable pivotal movement of said one half axle about a pivot axis extending essentially in the longitudinal direction of the vehicle, axle drive means, two wheel drive shafts driven by said axle drive means and driving said wheels, said one half axle including said axle drive means, first joint means including a part of said axle drive means for pivotally connecting said two shafts with each other, and second joint means coaxial with said first-mentioned joint means arranged at a height at least essentially equal to the level of the center of said wheels for pivotally connecting said two swinging half axles with each other, and to enable pivotal movement of said other half axle about a pivot point located substantially at the level of said height the other one of said half axles being of constant length and the pivotal movement thereof being determined by said coaxial joint means only, said first-mentioned joint means and said axle drive means being located on opposite sides of the vertical central longitudinal plane of the vehicle at such a distance therefrom as to render the length of one of said shafts between a respective wheel and said axle drive means equal to the length of the other shaft between a respective wheel and said first-mentioned joint means.

5. The combination according to claim 1, wherein said half axles are tubular and are provided with enlarged portions at the inner ends thereof housing said axle drive means.

6. The combination according to claim 5, wherein both said shafts are interchangeably alike.

7. The combination according to claim 1, wherein the axes of both of said joint means coincide with the central longitudinal plane of the vehicle.

References Cited in the file of this patent

UNITED STATES PATENTS

| | | |
|---|---|---|
| 1,937,653 | Haltenberger | Dec. 5, 1933 |
| 2,105,369 | Paton | Jan. 11, 1938 |
| 2,140,876 | Klavik | Dec. 20, 1938 |
| 2,422,739 | Lewis | June 24, 1947 |